United States Patent
Santra et al.

(10) Patent No.: US 11,734,628 B2
(45) Date of Patent: Aug. 22, 2023

(54) OPTIMIZING RESOURCE ALLOCATION FOR AN ORGANIZATION

(71) Applicant: CERNER INNOVATION, INC., Kansas City, KS (US)

(72) Inventors: Pravat Santra, Bangalore (IN); Chirag Bharatia, Bangalore (IN); Akkaladevi Vijay Krishna, Bangalore (IN); Neeraj Kumar, Bangalore (IN); Ravishankar Nagesh, Bangalore (IN); Nese Manjunatha, Bangalore (IN)

(73) Assignee: Cerner Innovation, Inc., Kansas City, MO (US)

( * ) Notice: Subject to any disclaimer, the term of this patent is extended or adjusted under 35 U.S.C. 154(b) by 13 days.

(21) Appl. No.: 16/454,762

(22) Filed: Jun. 27, 2019

(65) Prior Publication Data

US 2020/0410430 A1 Dec. 31, 2020

(51) Int. Cl.
*G06Q 10/0631* (2023.01)
*G05B 15/00* (2006.01)
(Continued)

(52) U.S. Cl.
CPC ....... *G06Q 10/06315* (2013.01); *G05B 15/00* (2013.01); *G05B 2219/2614* (2013.01);
(Continued)

(58) Field of Classification Search
CPC ......... G06Q 10/063118; G06Q 10/109; G06Q 10/06315; G06F 16/9035; G06F 1/3206; G05B 2219/2614; G05B 15/00
(Continued)

(56) References Cited

U.S. PATENT DOCUMENTS

2015/0370927 A1* 12/2015 Flaherty .............. F24D 19/1084
703/1
2018/0299846 A1* 10/2018 Ray ........................ G06Q 10/06
(Continued)

OTHER PUBLICATIONS

Fukuta, et al., Proposal for Home Energy Management System to Survey Individual Thermal Comfort Range for HVAC Control With Little Contribution From Users, 2015 IEEE 13th International Conference on Industrial Informatics (INDIN) (2015) (Year: 2015).*

*Primary Examiner* — Charles Guiliano
(74) *Attorney, Agent, or Firm* — Invoke

(57) ABSTRACT

Embodiments of the present disclosure relate to systems, methods, and user interfaces for optimizing resource allocation for an organization. More particularly, embodiments of the present disclosure utilize multiple data sets to enable organizations to make intuitive business decisions and plan resources accordingly. To do so, various data is collected at a resource engine that utilizes the data to determine resource utilization, occupancy density, and a recommendation. In various embodiments, the resource utilization, occupancy density, and a recommendation may be provided to a user as an alert, a report, or a user interface. The user interface may additionally enable the user to apply the recommendation. In some embodiments, the recommendation may be automatically applied or the user may be directed to perform the recommendation. The alert, report, or user interface may additionally inform the user of the impact of performing or not performing the recommendation.

28 Claims, 9 Drawing Sheets

(51) Int. Cl.
  *G06F 1/3206* (2019.01)
  *G06Q 10/109* (2023.01)
(52) U.S. Cl.
  CPC .... *G06F 1/3206* (2013.01); *G06Q 10/063118* (2013.01); *G06Q 10/109* (2013.01)
(58) Field of Classification Search
  USPC .............................................. 705/7.17, 7.25
  See application file for complete search history.

(56) References Cited

U.S. PATENT DOCUMENTS

2019/0035093 A1* 1/2019 Oami ..................... G06V 40/25
2020/0311619 A1* 10/2020 Ramirez Flores ...... G06F 9/542

* cited by examiner

OPTIMIZING RESOURCE ALLOCATION FOR AN ORGANIZATION

BACKGROUND

Many organizations have multiple footprints spread across a number of locations that vary from multiple locations in a particular geographic area (e.g., city or county) to multiple locations in multiple geographic areas (e.g., state, country, or continent). Management of the resources spread across each location can be time consuming, costly, and largely ineffective. For example, although a particular location may employ a number of employees, a percentage of those employees may routinely travel or work off-site (e.g., at home or another location). Because of this discrepancy, resources allocated to that location may not reflect actual need. Additionally, personnel that may be required to perform certain duties (e.g., information technology moves, adds, and changes, housekeeping, maintenance, security, and the like) with the least possible impact on working employees may not be properly scheduled or allocated to perform those duties. Accordingly, resources are often wasted, resulting in a loss of time, money, and efficiency.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present disclosure relate to systems, methods, and user interfaces for optimizing resource allocation for an organization. More particularly, embodiments of the present disclosure utilizes multiple data sets to enable organizations to make intuitive business decisions and plan resources accordingly. To do so, various data is collected at a resource engine that utilizes the data to determine resource utilization, occupancy density, and a recommendation. In various embodiments, the resource utilization, occupancy density, and a recommendation may be provided to a user as an alert, a report, or a user interface. The user interface may additionally enable the user to apply the recommendation. In some embodiments, the recommendation may be automatically applied or the user may be directed to perform the recommendation. The alert, report, or user interface may additionally inform the user of the impact of performing or not performing the recommendation.

BRIEF DESCRIPTION OF THE SEVERAL VIEWS OF THE DRAWINGS

The patent or application file contains at least one drawing executed in color. The present invention is described in detail below with reference to the attached drawing figures, wherein.

DETAILED DESCRIPTION

Figure 1:
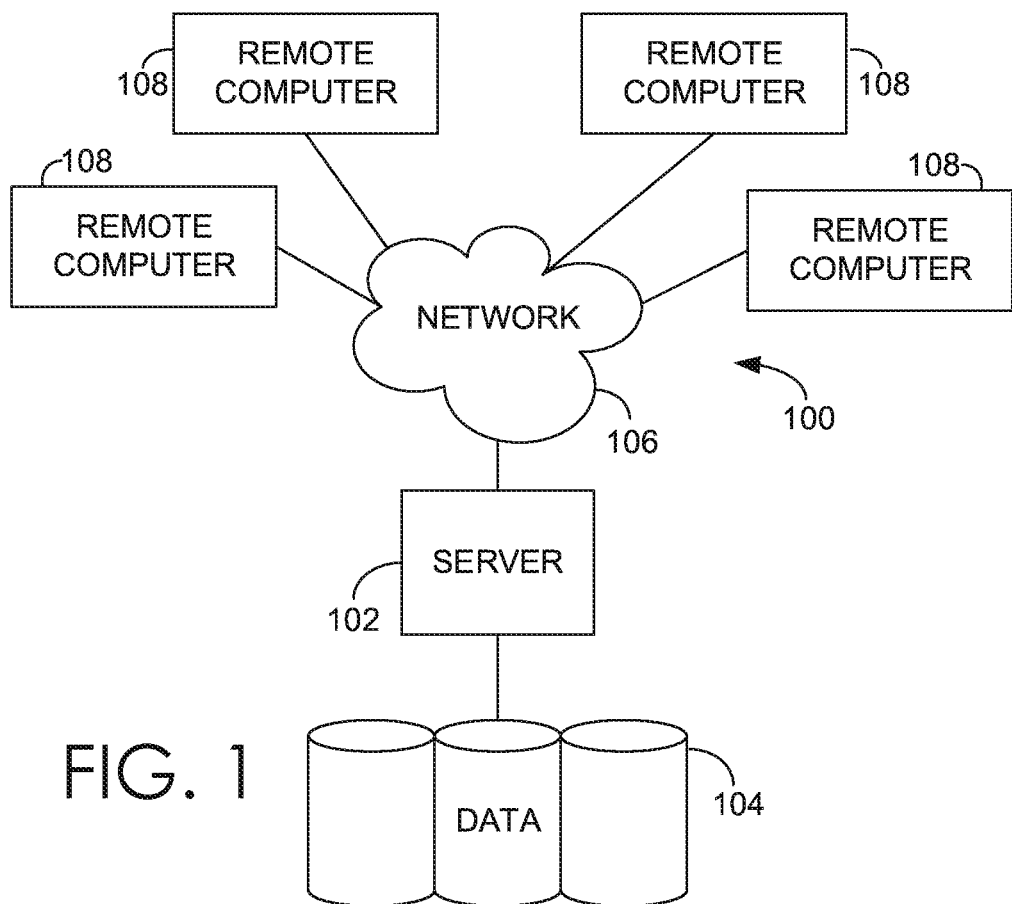
FIG. 1 is a block diagram of an exemplary operating environment suitable to implement embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

As noted in the background, many organizations have multiple footprints spread across a number of locations that vary from multiple locations in a particular geographic area (e.g., city or county) to multiple locations in multiple geographic areas (e.g., state, country, or continent). Management of the resources spread across each location can be time consuming, costly, and largely ineffective. For example, although a particular location may employ a number of employees, a percentage of those employees may routinely travel or work off-site (e.g., at home or another location). Because of this discrepancy, resources allocated to that location may not reflect actual need. Additionally, personnel that may be required to perform certain duties (e.g., information technology moves, adds, and changes, housekeeping, maintenance, security, and the like) with the least possible impact on working employees may not be properly scheduled or allocated to perform those duties. Accordingly, resources are often wasted, resulting in a loss of time, money, and efficiency.

Embodiments of the present disclosure relate to systems, methods, and user interfaces for optimizing resource allocation for an organization. More particularly, embodiments of the present disclosure utilizes multiple data sets to enable organizations to make intuitive business decisions and plan resources accordingly. To do so, various data is collected at a resource engine (e.g., Cerner Technology Services Airlens) that utilizes the data to determine resource utilization, occupancy density, and a recommendation. For clarity, the recommendation is a suggestion to relocate a particular resource of the organization based on the current data as collected by the resource engine. In various embodiments, the resource utilization, occupancy density, and a recommendation may be provided to a user as an alert, a report, or a user interface. The user interface may additionally enable the user to apply the recommendation. In some embodiments, the recommendation may be automatically applied or the user may be directed to perform the recommendation. The alert, report, or user interface may additionally inform the user of the impact of performing or not performing the recommendation.

Continuing the employee example above, consider that organization data indicates that location A employs X number of employees and location B employees Y number of employees. Also, consider that organization data indicates capacity at each location. Other data, such as VPN data, human capital data, systems data, network performance data, or application performance data may indicate a surplus of a particular resource at location A and a deficiency of that resource at location B. The resource engine may identify such surplus or deficiency by determining the resource utilization and occupancy density at each location and further determine a recommendation to reallocate the resource. Accordingly, maximum utility can be derived from each resource and gains in time, money, and efficiency can be realized.

Accordingly, one embodiment of the present disclosure is directed to one or more computer storage media having computer-executable instructions embodied thereon that, when executed by a computer, causes the computer to perform operations. The operations receiving data comprising one or more of: organization data, virtual private network (VPN) data, human capital data, systems data, network performance data, or application performance data corresponding to an organization. The operations also include receiving a selection of filters to apply to the data. The operations further include, based on the application of the selection of filters to the data, generating, at a resource engine, a report that determines resource utilization, occupancy density, and a recommendation.

In another embodiment, the present disclosure directed to a computerized method. The method comprises receiving data comprising one or more of: organization data, virtual private network (VPN) data, human capital data, or a systems data, network performance data, or application performance data corresponding to an organization. The method also includes, based on the data, generating, at a resource engine, a user interface that identifies resource utilization corresponding to a particular resource at a location of the organization, occupancy density that distinguishes between local users and remotes users for the location, and a recommendation. The method further includes enabling a user to utilize the GUI to facilitate applying the recommendation.

In yet another embodiment, the present disclosure is directed to a system. The system comprises a processor; and a computer storage medium storing computer-usable instructions that, when used by the processor, cause the processor to: receive data comprising one or more of: organization data, virtual private network (VPN) data, human capital data, systems data, network performance data, or application performance data corresponding to an organization having one or more locations; based on the data, generate, at a resource engine, a user interface that determines resource utilization corresponding to a particular resource at a location of the one or more locations, occupancy density that distinguishes between local users and remotes users for the location, and a recommendation; and automatically apply the recommendation or direct the recommendation to be performed.

Having briefly described embodiments of the present invention, an exemplary operating environment suitable for use in implementing embodiments of the present invention is described below. FIG. 1 provides an aspect of an example operating environment with which embodiments of the present invention may be implemented. The aspect of an operating environment is illustrated and designated generally as reference numeral 100.

Example operating environment 100 comprises a general purpose computing device in the form of a control server 102. Exemplary components of the control server 102 comprise a processing unit, internal system memory, and a suitable system bus for coupling various system components, including database cluster 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

Control server 102 typically includes therein, or has access to, a variety of computer-readable media, for instance, database cluster 104. Computer-readable media can be any available media that might be accessed by control server 102, and includes volatile and nonvolatile media, as well as, removable and nonremovable media. Computer-readable media might include computer storage media. Computer storage media includes volatile and nonvolatile media, as well as removable and nonremovable media implemented in any method or technology for storage of information, such as computer-readable instructions, data structures, program modules, or other data. In this regard, computer storage media might comprise RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the control server 102. Computer storage media does not comprise signals per se. Combinations of any of the above also may be included within the scope of computer-readable media.

The computer storage media discussed above and illustrated in FIG. 1, including database cluster 104, provide storage of computer-readable instructions, data structures, program modules, and other data for the control server 102. In some embodiments, database cluster 104 takes the form of a cloud-based data store, and in some embodiments is accessible by a cloud-based computing platform.

The control server 102 might operate in a computer network 106 using logical connections to one or more remote computers 108. Remote computers 108 might be located at a variety of locations. The remote computers 108 might be personal computers, servers, routers, network PCs, peer devices, other common network nodes, or the like and might comprise some or all of the elements described above in relation to the control server 102. The devices can be personal digital assistants or other like devices.

Exemplary computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networked environment, program modules or portions thereof might be stored in association with the control server 102, the database cluster 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a pointing device (commonly referred to as a mouse), a trackball, or a touch pad. Other input devices comprise microphones, satellite dishes, scanners, or the like. Commands and information might also be sent directly from a remote health care device to the control server 102. In addition to a monitor, the control server 102 and/or remote computers 108 might comprise other peripheral output devices, such as speakers and a printer.

In some embodiments, control server 102 is a computing system or platform made up of one or more computing devices. Embodiments of control server 102 may be a distributed computing system, a centralized computing system, a single computer such as a desktop or laptop computer or a networked computing system. Thus, in some embodiments, control server 102 comprises a multi-agent computer system with software agents.

Figure 2:
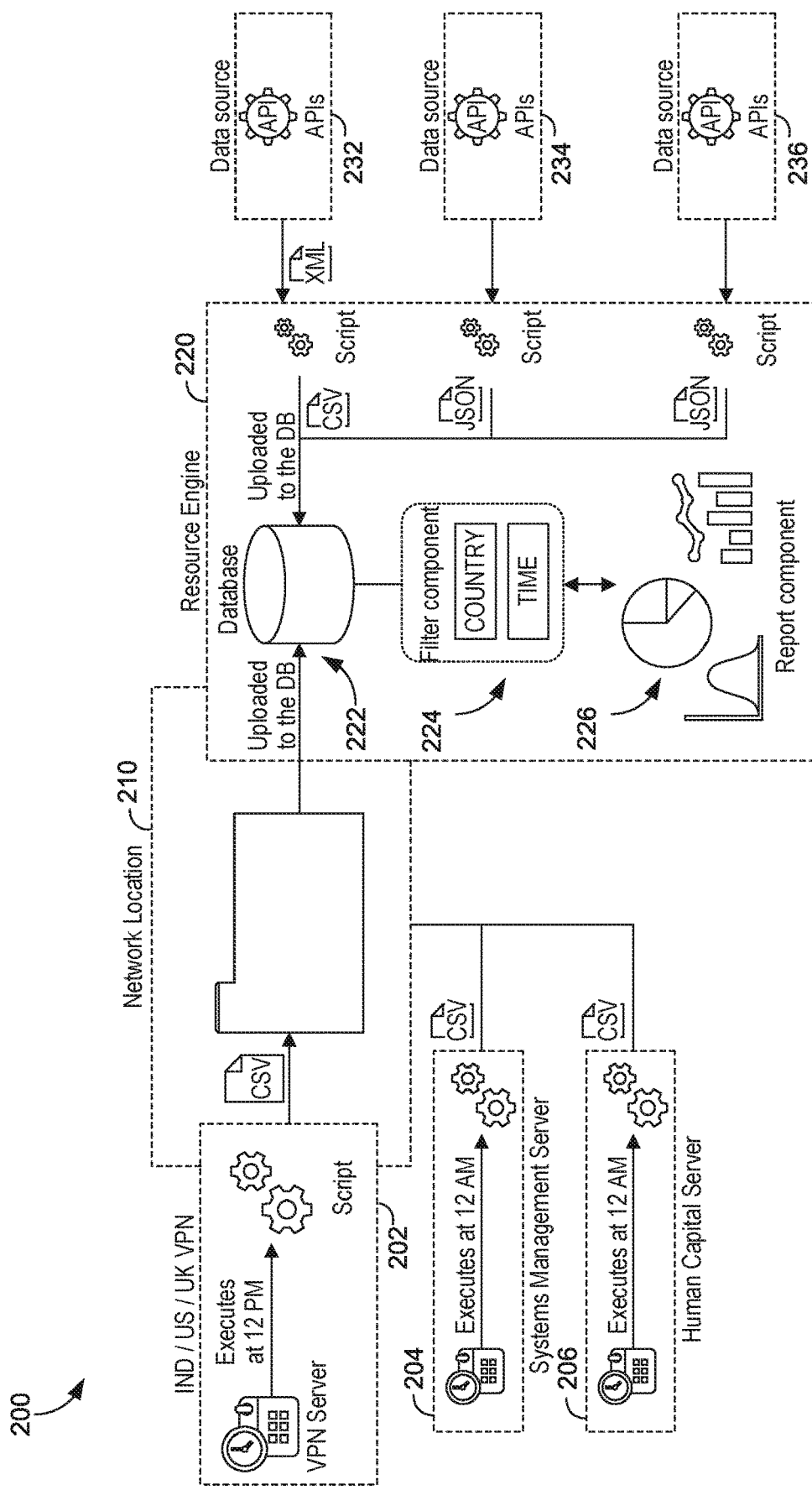
FIG. 2 depicts an exemplary framework of a resource system suitable to implement embodiments of the present invention.

Turning now to FIG. 2, an exemplary framework of a resource system 200 is shown, in accordance with an aspect of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The resource system 200 may be implemented via any type of computing device, such as computing device 100 described above with reference to FIG. 1, for example.

The resource system 200 generally provides user interfaces for optimizing resource allocation for an organization. More particularly, the resource system 200 utilizes multiple data sets to enable organizations to make intuitive business decisions and plan resources accordingly. In doing so, the resource system 200 ensures maximum utility can be derived from each resource and gains in time, money, and efficiency can be realized.

As shown in FIG. 2, the resource system 200 includes, among other components not shown, VPN server 202, systems management server 204, human capital server 206, network location 210, resource engine 220, and data source(s) 232, 234, 236. It should be understood that the resource system 200 shown in FIG. 2 is an example of one suitable computing system architecture. Each of the components shown in FIG. 2 may be implemented via any type of computing device, such as computing device 100 described with reference to FIG. 1, for example.

The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of VPN servers, systems management servers, human capital servers, network locations, resource engines, and data sources may be employed within the resource system 200 within the scope of the present disclosure. Each may comprise a single device or multiple devices cooperating in a distributed environment. For instance, the resource engine 220 may be provided via multiple devices arranged in a distributed environment that collectively provide the functionality described herein. In other embodiments, a single device may provide the functionality of multiple components of the resource system 200. For example, a single device may provide the resource engine 220. Additionally, other components not shown may also be included within the network environment.

Generally, the resource engine 220 generates a user interface that identifies resource utilization and makes recommendations for resource allocation. The resource engine 220 ensures maximum utility can be derived from each resource. In embodiments, a user may access and utilize the features of the resource engine 220 via an interface or report provided by the resource engine 220 and accessible by a user device.

Initially, the resource engine 220 receives data via one or more sources. For example, the VPN server 202 may provide VPN data for a location or locations of the organization. The systems management server 204 may provide systems data corresponding to a network of devices at a location or locations of the organization. The human capital server 206 may provide data corresponding to employees at a location or location of the organization. A script may collect data at various intervals from each of the VPN server 202, the systems management server 204, and the human capital server 206 and aggregated the data at a network location 210. The script may collect the data in particular format (e.g., comma separated value (CSV) file) and the data may be uploaded to database 222 of the resource engine 220.

Additionally, application programming interfaces (APIs) on a number of other data sources (e.g., ARUBA AirWave, CISCO AppDynamics) may enable additional collection of data. A script may collect this data at various intervals via the APIs. The script may collect the data in a variety of formats (e.g., a CSV file or a JavaScript Object Notation (JSON file) and the data may be uploaded to the database 222.

Once the data has been consolidated in the database 222, filter component 224 may enable a user to select various filters. For example, the user may want reports over a specific time period, for a specific country, for a specific location, or for a particular resource. The filter component 224 applies the selected filter and report component 226 generates a report and/or user interface. The report and/or user interface identifies resource utilization corresponding to a particular resource at a location of the organization (based on the selected filters), occupancy density that distinguishes between local users and remote users for the location, and a recommendation.

The user interface may additionally enable a user to utilize the user interface to facilitate applying the recommendation. For example, the user interface may enable the user to reallocate resources via the interface so the location can more efficiently utilized the resources. Power, lighting, heating, or cooling may be adjusted based on the number of users physically present at a location. Security personnel may be reallocated based on the number of female users physically present at a location. Various information technology tasks (e.g., moves, adds, and changes) or other items (e.g., meeting room, cafeteria space, and the like) or tasks (e.g., housekeeping or maintenance) needing scheduling may be scheduled based on current utilization of resources at a particular location. In some embodiments, the resource system may automatically apply the recommendations (e.g., adjust the power, lighting, heating, or cooling). In other embodiments, a user may be directed to perform the recommendation. Reports or alerts may also be communicated to users via user devices that enable the user to take corrective action based on the information contained in the report or alert.

With reference to FIGS. 3-7, illustrative screen displays 300, 400, 500, 600, 700 of embodiments of the present invention are shown. It is understood that each of the illustrative screen displays are connected logically, such that they comprise a user interface designed for optimizing resource allocation for an organization. The screen displays may appear in any order and with any number of screen displays, without regard to whether the screen display is described or depicted herein. The screen displays provide tools that enable higher quality, consistency, and efficiency during the path check process, in accordance with embodiments of the present invention.

Figure 3:
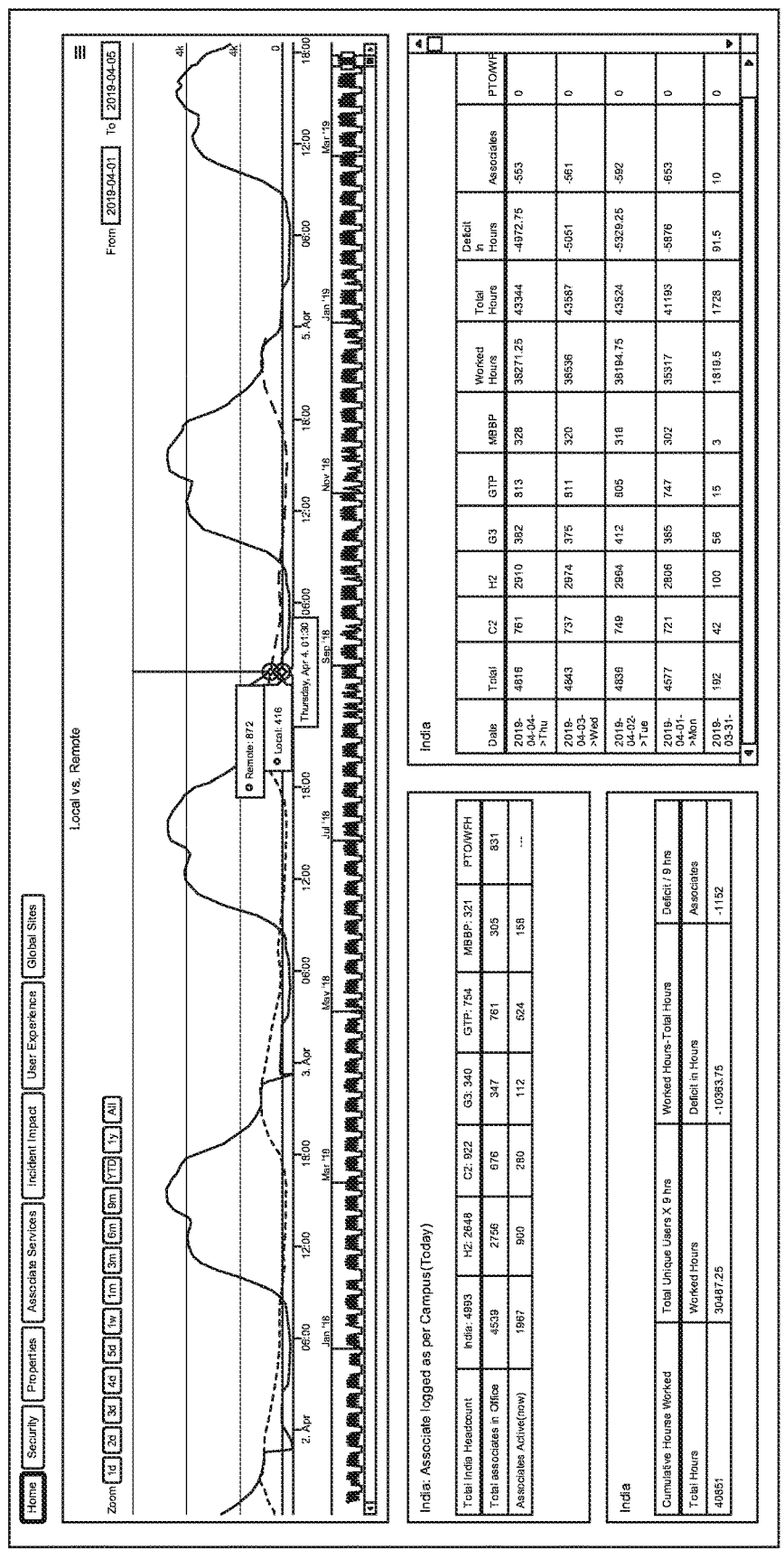
FIG. 3 depicts an illustrative screen display of network utilization comparison between local and remote users, in accordance with embodiments of the present invention.

Referring initially to FIG. 3, an illustrative screen display 300 of a network utilization comparison between local and remote users is depicted, in accordance with embodiments of the present invention. This comparison may be utilized to drive recommendations regarding allocation of various resources to locations that may need more or may require less resources based on the number of local users, or users that are physically present at a location.

Figure 4:
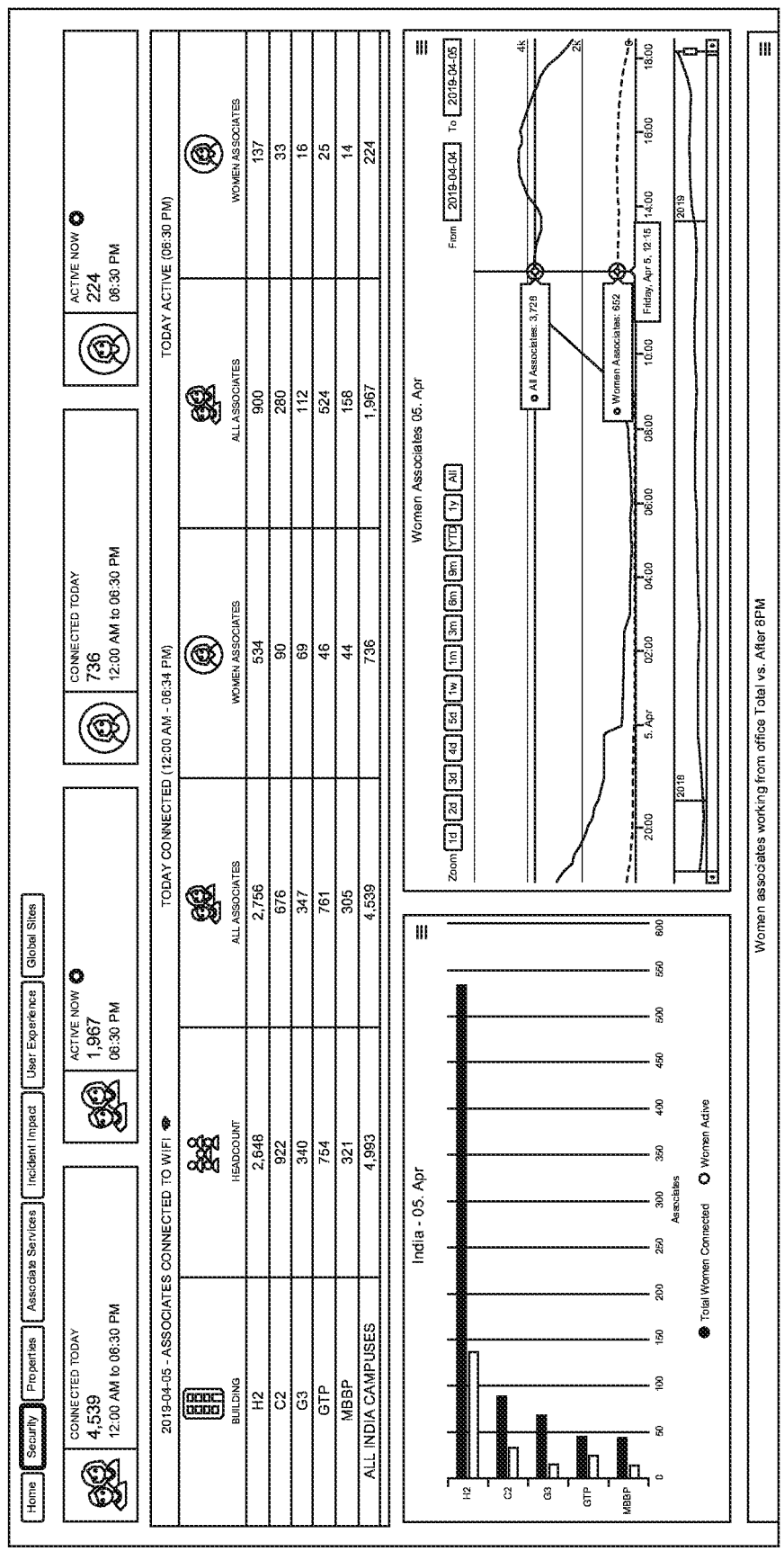
FIG. 4 depicts an illustrative screen display of occupancy density per gender, in accordance with embodiments of the present invention.

Turning to FIG. 4, an illustrative screen display 400 of occupancy density per gender is depicted, in accordance with embodiments of the present invention. As illustrated, the data may provide a breakdown in a demographic corresponding to users that are physically present at a location. For example, a count of female associates physically present in a location may be valuable to a security team so the security team can allocate additional personnel to areas where the female associates are located to make evening departure safer for the female associates.

Figure 5:
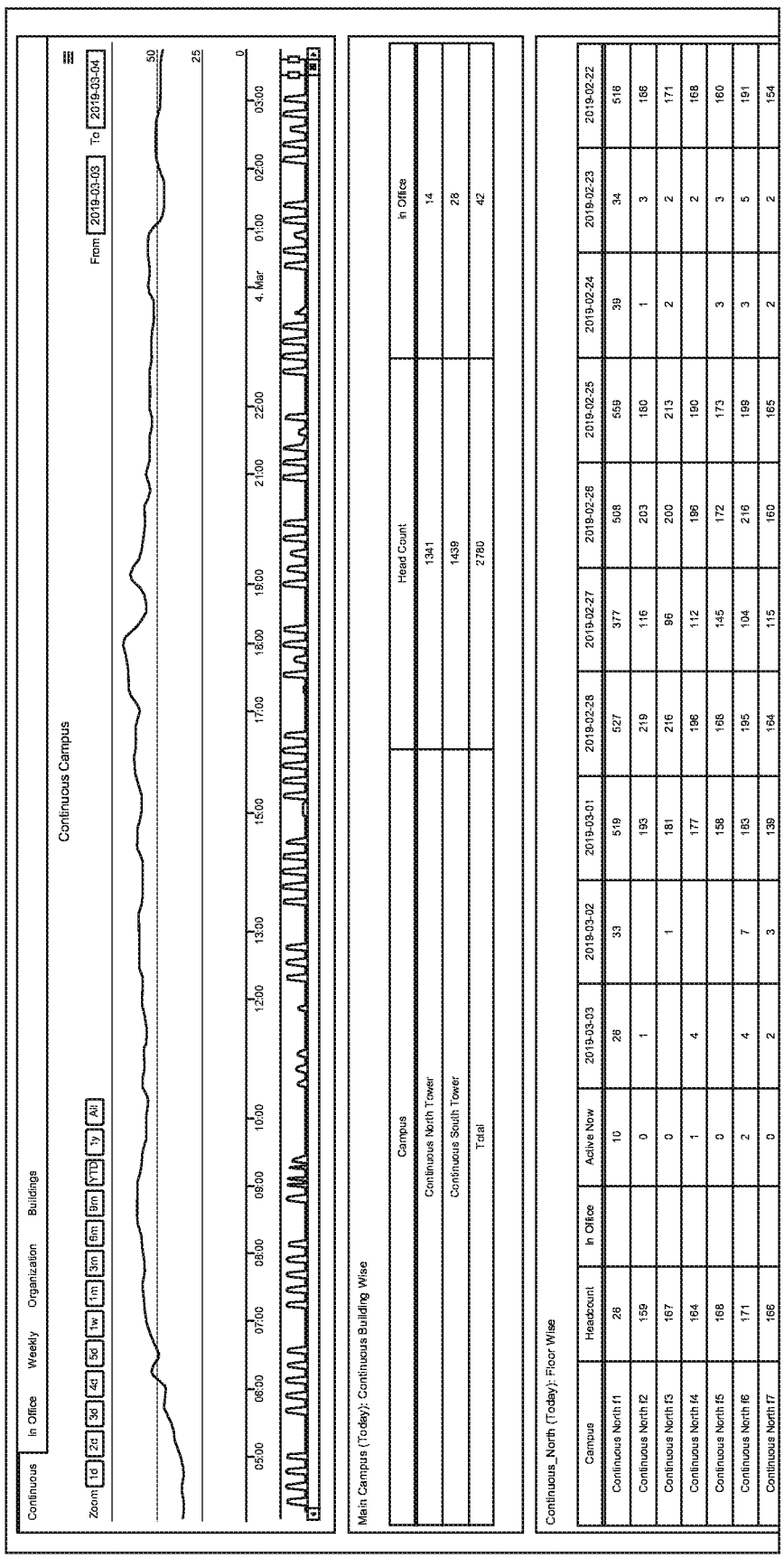
FIG. 5 depicts an illustrative screen display of occupancy density per continuous campus, in accordance with embodiments of the present invention.

In FIG. 5, an illustrative screen display 500 of occupancy density per continuous campus is depicted, in accordance with embodiments of the present invention. For locations with multiple buildings (i.e., a continuous campus), associates may not always be physically present in the same building. As highlighted, the data may provide a breakdown of users physically present in each building which may be useful to dynamically reallocate various resources based on the changing patterns of physical presence within in each building.

Figure 6:
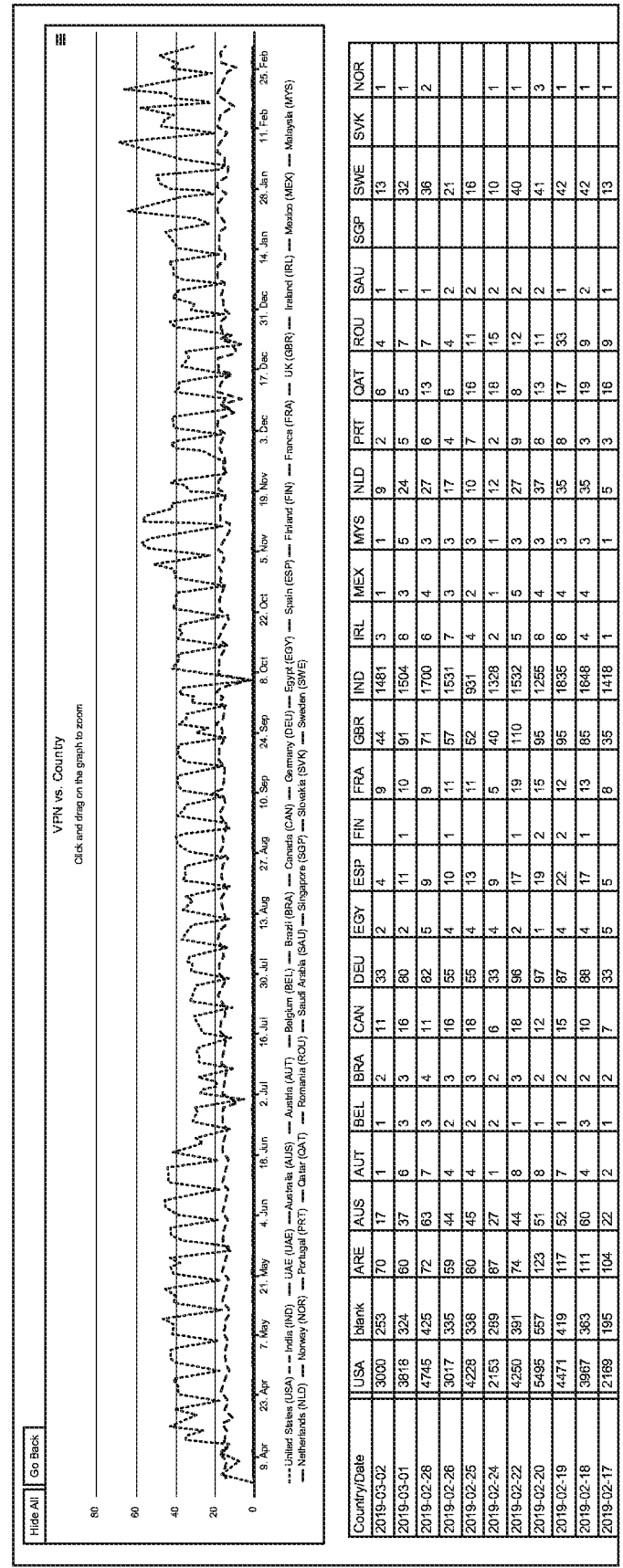
FIG. 6 depicts an illustrative screen display of virtual private network data per country, in accordance with embodiments of the present invention.

Referring to FIG. 6, an illustrative screen display 600 of VPN data per country is depicted, in accordance with embodiments of the present invention. As shown, details corresponding to a number of VPN users for the organization in each country is illustrated in both graph and chart format. This data can be utilized to drive recommendations such as reallocating office space or other resources of locations where users are not physically present.

Figure 7:
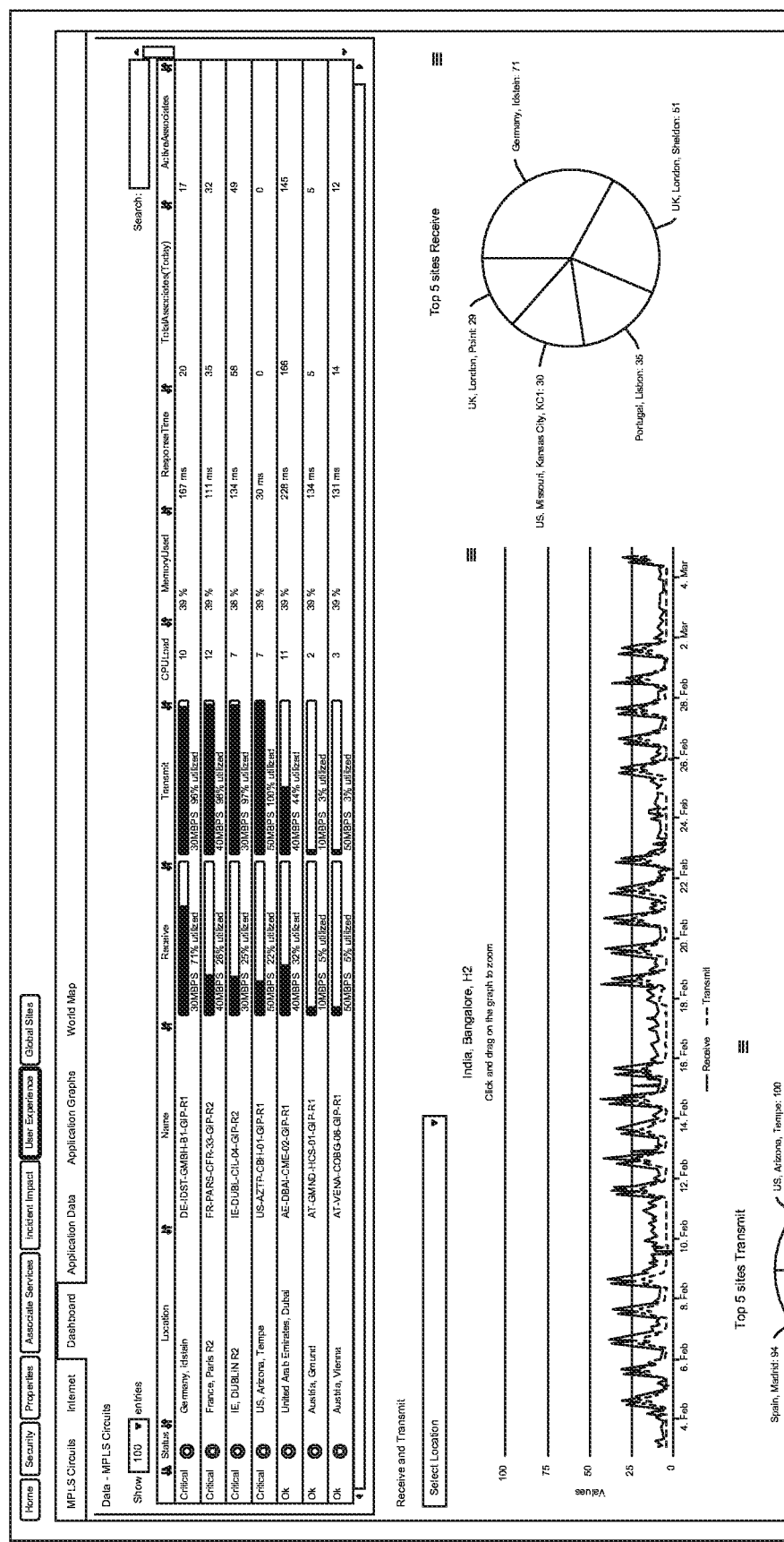
FIG. 7 depicts an illustrative screen display of user experience per location, in accordance with embodiments of the present invention.

Turning to FIG. 7, an illustrative screen display 800 of user experience per location is depicted, in accordance with embodiments of the present invention. In this display 800, receive and transmit speeds corresponding to locations of the organization identify receive and transmit utilization. Again, this data can be utilized to drive recommendations such as providing additional bandwidth to locations that may be experiencing bottlenecks due to high utilization.

Figure 8:
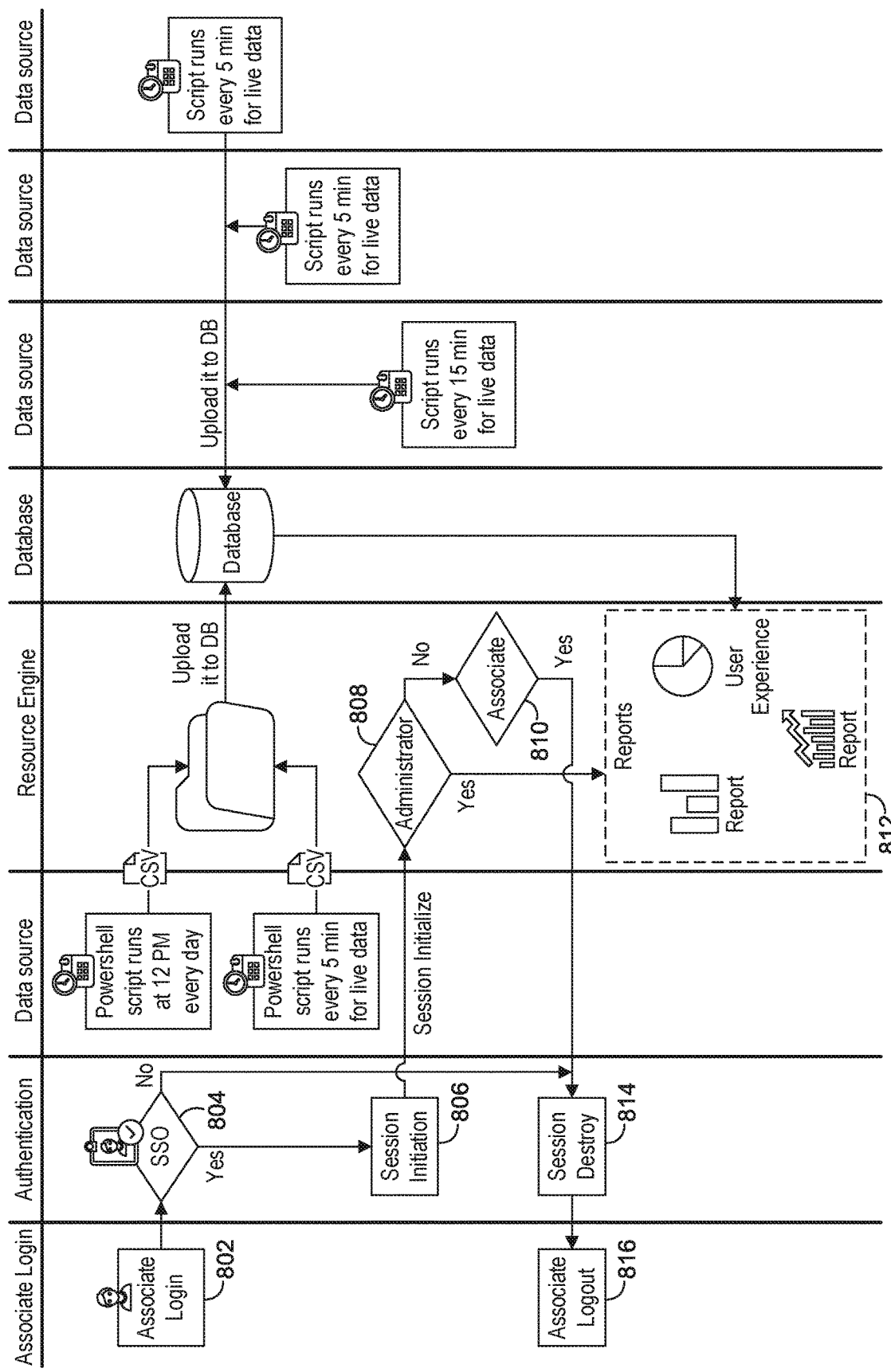
FIG. 8 depicts a flow diagram illustrating accessing resource utilization reports for an organization, in accordance with an embodiment of the present invention.

In FIG. 8, a flow diagram is provided illustrating a method 800 of accessing resource utilization reports for an organization, in accordance with embodiments of the present invention. Method 800 may be performed by any computing device (such as computing device described with respect to FIG. 1) with access to an resource system (such as the one described with respect to FIG. 2) or by one or more components of the resource system.

Initially, at step 802, a user provides login credentials to login to the resource system. If the user is not authenticated, the login session is destroyed, at step 814, and the user is logged out, at step 816. If the user is authenticated, the session is initialized, at step 806. A determination is made, at step 808, whether the user has administrator rights. If the user does not have administrator rights, as shown at step 810, the login session is destroyed, at step 814, and the user is logged out, at step 816. If the user does have administrator rights, the use is provided access to the reports, at step 812. As described herein, the reports (e.g., the user interface) may enable the user to reallocate resources automatically in response to a recommendation or may direct the user to reallocate resources manually.

Figure 9:
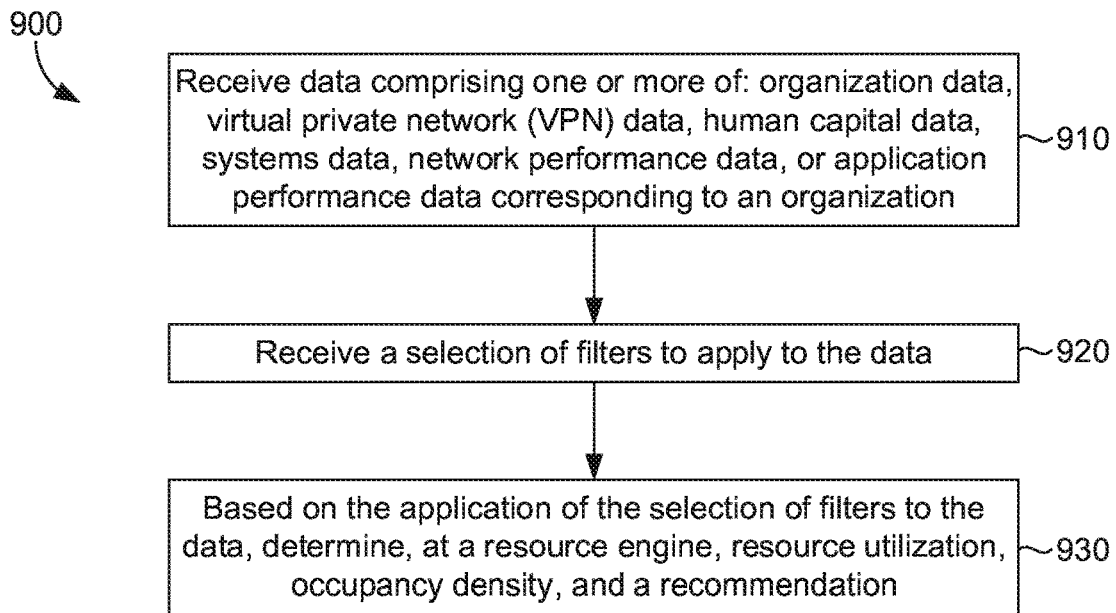
FIG. 9 depicts a flow diagram of optimizing resource allocation for an organization, in accordance with an embodiment of the present invention.

Turning now to FIG. 9, a flow diagram is provided illustrating a method 900 for optimizing resource allocation for an organization, in accordance with embodiments of the present invention. Method 900 may be performed by any computing device (such as computing device described with respect to FIG. 1) with access to an resource system (such as the one described with respect to FIG. 2) or by one or more components of the resource system.

Initially, at step 910 data comprising one or more of: organization data, virtual private network (VPN) data, human capital data, systems data, network performance data, or application performance data corresponding to an organization is received. A selection of filters to apply to the data is received at step 920.

Based on the application of the selection of filters to the data, a resource engine determines, at step 930, resource utilization, occupancy density, and a recommendation. The occupancy density may distinguish between local user and remotes users for a location of the organization. The resource utilization may correspond to a particular resource at a location of the organization. In some embodiments, the data further comprises presence data corresponding to a physical presence of personnel at a location of the organization.

In some embodiments, an alert is communicated to a user. The alert may comprise one or more of the resource utilization, the occupancy density, and the recommendation. Additionally or alternatively, in some embodiments, a report is communicated to a user. The report may comprise one or more of the resource utilization, the occupancy density, and the recommendation. Additionally or alternatively, in some embodiments, a user interface is generated. The user interface may comprise one or more of the resource utilization, the occupancy density, and the recommendation. The user interface may further facilitate the user applying the recommendation. In some embodiments, the recommendation may be automatically applied. Additionally or alternatively, a user may be directed to perform the recommendation.

In an embodiment, the particular resource corresponds to power or cooling at a location of the organization and the recommendation is for power or cooling adjustment at the location.

In an embodiment, the particular resource is a cafeteria at the location and the recommendation is a time to visit the cafeteria.

In an embodiment, the particular resource is security personnel at the location and the recommendation is to reallocate security personnel.

In an embodiment, the particular resource is a physical asset (e.g., a conference room, a device or object, and the like) at the location and the recommendation is a time to schedule the physical asset.

In an embodiment, the particular resource is maintenance or housekeeping personnel and the recommendation to perform a maintenance activity or housekeeping activity at the location.

In an embodiment, the particular resource is an information technology resource and the recommendation is an action for IT personnel to perform.

In an embodiment, the particular resource is an information technology resource and the recommendation is an action for a user of the information technology resource to perform.

Figure 10:
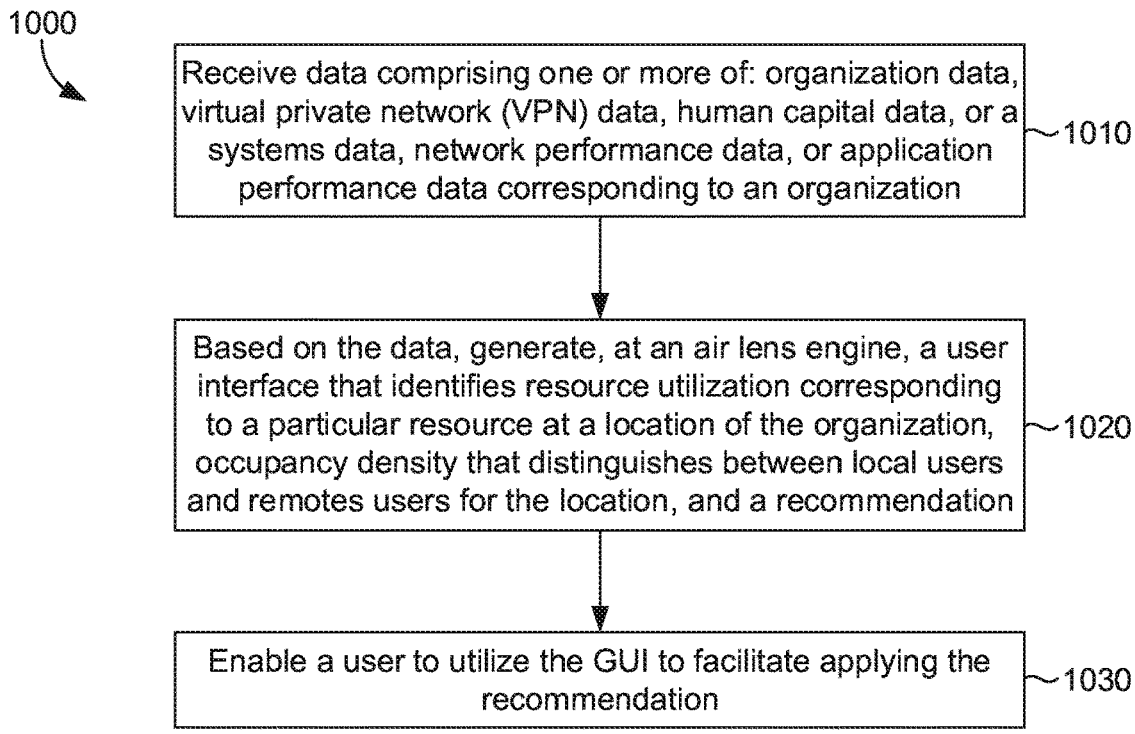
FIG. 10 depicts a flow diagram of optimizing resource allocation for an organization, in accordance with an embodiment of the present invention.

Turning now to FIG. 10, a flow diagram is provided illustrating a method 1000 for optimizing resource allocation for an organization, in accordance with embodiments of the present invention. Method 1000 may be performed by any computing device (such as computing device described with respect to FIG. 1) with access to an resource system (such as the one described with respect to FIG. 2) or by one or more components of the resource system.

Initially, at step 1010, data comprising one or more of: organization data, virtual private network (VPN) data, human capital data, or a systems data, network performance data, or application performance data corresponding to an organization is received. In embodiments, a selection of filters may be received and applied to the data. The filters may, for example, filter data corresponding to a particular location of the organization, a particular type of employee of the organization, a particular type of data to be used by the resource engine, a particular resource of interest, and the like.

Based on the data, at step 1020, a user interface is generated at a resource engine that determines resource utilization corresponding to a particular resource at a location of the organization, occupancy density that distinguishes between local users and remotes users for the location, and a recommendation. The user interface may further be generated based on an application of the selection of filters to the data. At step 1030, the user interface enables the user to facilitate applying the recommendation.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Accordingly, the scope of the invention is intended to be limited only by the following claims.

What is claimed is:

1. One or more computer storage media having computer-executable instructions embodied thereon that, when executed by a computer, causes the computer to initiate operations comprising:
   receiving, at a resource engine of a resource system, data comprising:
      first data from a VPN-data server and corresponding to one or more locations of an enterprise wide computer network;
      second data from a systems-management-data server and corresponding to a network of devices at the one or more locations; and
      third data from a resource-capital-data server and corresponding to resource users at the one or more locations,
   the receiving based on a script collecting the first, second, and third data:
      (a) at respective first, second, and third intervals that differ at least partially; and
      (b) via corresponding application programming interfaces (APIs);
   transforming and storing at least a portion of the data at a database associated with the resource engine;
   receiving, from an electronic interface generated by the resource engine, a selection of filters to apply to the data;
   based on applying the selection of filters to the data, determining, at the resource engine, a current resource utilization identifying resource consumption by local resource users and by remote resource users; and
   based at least on the current resource utilization, dynamically reallocating or configuring at least a portion of resources associated with power, physical network connectivity, physical network performance, lighting, heating, or cooling.

2. The one or more media of claim 1, the operations further comprising communicating an alert to a user indicating one or more of the current resource utilization or a recommendation regarding the current resource utilization.

3. The one or more media of claim 1, wherein the current resource utilization distinguishes between consumption by local resource users and remote resource users for a location of an organization.

4. The one or more media of claim 1, wherein the operations further comprise determining a recommendation associated with the current resource utilization, and wherein the recommendation is for power or cooling adjustment at a location.

5. The one or more media of claim 1, wherein the operations further comprise determining, at the resource engine, a current occupancy density distinguishing between local occupants and remote occupants, and wherein the recommendation includes a time to visit the cafeteria.

6. The one or more media of claim 1, wherein the operations further comprise determining, at the resource engine, a current occupancy at a location, and generating a recommendation to reallocate security personnel at the location.

7. The one or more media of claim 1, wherein the operations further comprise determining, at the resource engine, a current occupancy at a location, and generating a recommendation to perform a maintenance activity or housekeeping activity at the location.

8. The one or more media of claim 1, wherein the operations further comprise determining, at the resource engine, a current occupancy at a location, and generating a recommendation of an action for IT personnel to perform at the location.

9. The one or more media of claim 1, wherein the operations further comprise determining, at the resource engine, a current occupancy at a location, and generating a recommendation of an action for a user of an information technology resource to perform at the location.

10. The one or more media of claim 1, wherein the data further comprises presence data corresponding to a physical presence of personnel at a location of an organization.

11. The one or more media of claim 1, further comprising communicating a report to a user comprising the current resource utilization.

12. The one or more media of claim 1, wherein at least one of the operations is performed using a plurality of electronic agents that are associated with a distributed memory.

13. The one or more media of claim 1, wherein the resource users comprise network components that are able to use the resources.

14. The one or more media of claim 13, wherein a plurality of the network components is associated with a corresponding plurality of personnel of an organization that is able to use the enterprise wide computer network.

15. The one or more media of claim 1, wherein the operations further comprise determining, at the resource engine: a current occupancy density, distinguishing between local associates and remote associates of the enterprise wide computer network.

16. The one or more media of claim 15, wherein the operations further comprise identifying a number of associates of a particular gender physically present in the one or more locations.

17. The one or more media of claim 1, wherein the operations further comprise determining, at the resource engine, a current occupancy density distinguishing between local occupants and remote occupants.

18. The one or more media of claim 17, wherein the operations further comprise identifying a number of evening-work occupants physically present in the one or more locations.

19. The one or more media of claim 18, wherein the operations further comprise dynamically reallocating personnel associated with at least a portion of the resources corresponding to the number.

20. The one or more media of claim 19, wherein the personnel include associates tasked with ensuring safe evening departure for the evening-work associates.

21. The one or more media of claim 1, wherein the operations further comprise identifying a quantity of resource users of a particular identified type physically present in the one or more locations.

22. The one or more media of claim 21, wherein the operations further comprise determining a recommendation associated with the identified quantity of resources.

23. The one or more media of claim 22, wherein the dynamically reallocating is based at least in part on the identified quantity of resources and corresponds to the determined recommendation.

24. The one or more media of claim 21, wherein the dynamically reallocating is based on the identified quantity.

25. A computerized method, comprising:
receiving, at a resource engine of a resource system, data comprising:
first data from a VPN-data server and corresponding to one or more locations of an enterprise wide computer network;
second data from a systems-management-data server and corresponding to a network of devices at the one or more locations ; and
third data from a resource-capital-data server and corresponding to resource users at the one or more locations the receiving based on a script collecting the first, second, and third data:
(a) at respective first, second, and third intervals that differ at least partially; and
(b) via corresponding application programming interfaces (APIs);
transforming and storing at least a portion of the data at a database associated with the resource engine;
determining, at the resource engine, a current resource utilization identifying resource consumption by local resource users and by remote resource users location; and
based at least on the current resource utilization, dynamically reallocating or configuring at least a portion of resources associated with power, physical network connectivity, physical network performance, lighting, heating, or cooling.

26. The method of claim 25, further comprising receiving, from an electronic interface generated by the resource engine, a selection of filters to apply to the data.

27. The method of claim 26, wherein the current resource utilization is determined based on an application of the selection of filters to the data.

28. A system comprising a processor and a computer storage medium storing computer-usable instructions that, when used by the processor, cause the processor to initiate operations comprising:
receiving, at a resource engine of a resource system, data comprising:
first data from a VPN-data server and corresponding to one or more locations of an enterprise wide computer network;
second data from a systems-management-data server and corresponding to a network of devices at the one or more locations ; and
third data from a resource-capital-data server and corresponding to resource users at the one or more locations the receiving based on a script collecting the first, second, and third data:
(a) at respective first, second, and third intervals that differ at least partially; and
(b) via corresponding application programming interfaces (APIs);
transforming and storing at least a portion of the data at a database associated with the resource engine;
receiving, from an electronic interface generated by the resource engine, a selection of filters to apply to the data;
based on applying the selection of filters to the data, determining, at the resource engine, a current resource utilization identifying resource consumption by local resource users and by remote resource users location; and based at least on the current resource utilization, dynamically reallocating or configuring at least a portion of resources associated with power, physical network connectivity, physical network performance, lighting, heating, or cooling.

\* \* \* \* \*